(No Model.)
J. W. PYLE & G. W. MARTIN.
DEVICE FOR MOLDING MOLDS.
No. 538,346. Patented Apr. 30, 1895.
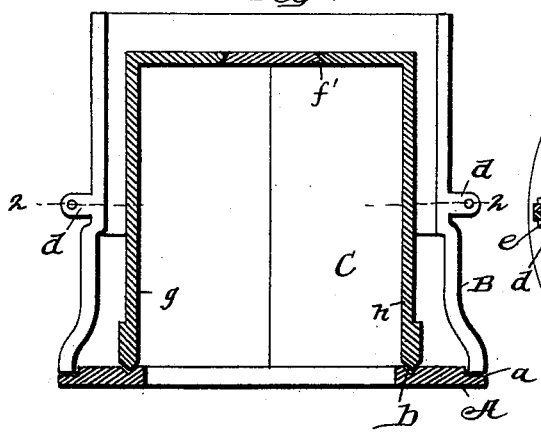
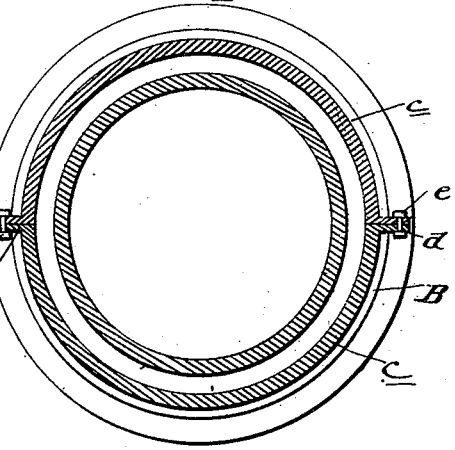
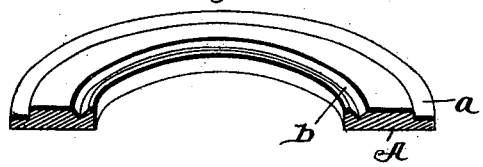
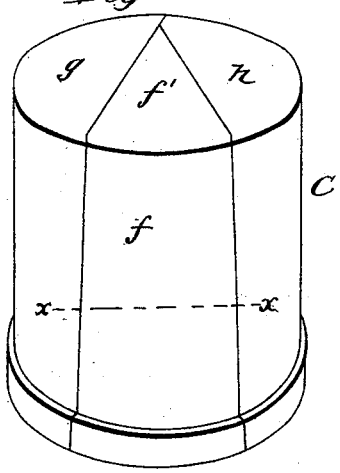
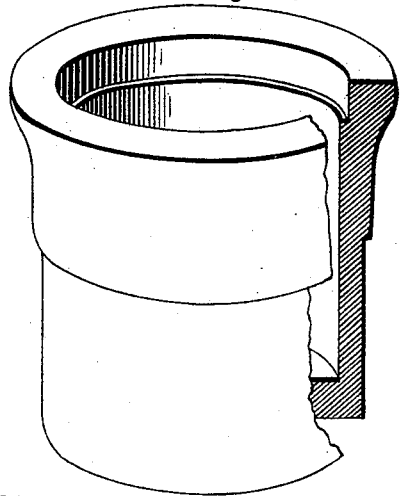
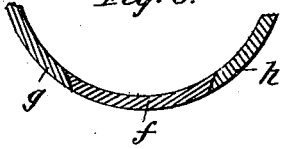
Witnesses:
Inventors:
J. W. Pyle & G. W. Martin
By James J. Sheehy
Attorney ically called United States Patent Office.

JOSEPH W. PYLE AND GAYLORD W. MARTIN, OF FORT SCOTT, KANSAS; SAID PYLE ASSIGNOR TO SAID MARTIN.

DEVICE FOR MOLDING MOLDS.

SPECIFICATION forming part of Letters Patent No. 538,346, dated April 30, 1895.

Application filed December 26, 1893. Serial No. 494,799. (No model.)

*To all whom it may concern:*

Be it known that we, JOSEPH W. PYLE and GAYLORD W. MARTIN, citizens of the United States, residing at Fort Scott, in the county of Bourbon and State of Kansas, have invented certain new and useful Improvements in Devices for Molding Molds; and we do declare the following to be a full, clear, and exact description of the invention, such as will enable others skilled in the art to which it appertains to make and use the same.

Our invention relates to improvements in devices for molding molds, and it has for one of its objects to provide such a device adapted to form molds of plaster of paris or the like of equal internal diameter at the bottom and top so that earthenware jars molded therein will be of the same external diameter at the bottom and top and will therefore be adapted to stand firmly on top of each other.

Another object of the invention is to provide a device for molding molds, of a cheap and simple construction and one which may be readily put together and which may be as readily removed from the mold after the formation of the same without danger of breaking it.

Other objects and advantages will appear from the following description and claims when taken in connection with the annexed drawings, in which—

Figure 1 is a vertical, diametrical section of our improved device with the parts in their operative position. Fig. 2 is a horizontal section taken in the plane indicated by the line 2 2 of Fig. 1. Fig. 3 is a sectional, perspective view of a portion of the base plate of our device. Fig. 4 is a perspective view of the core removed. Fig. 5 is a perspective view of a mold formed by our improved device; and Fig. 6 is a detail section taken in the plane indicated by the line $x\ x$ of Fig. 4.

Referring by letter to said drawings: A indicates the base of our improved device, which is preferably annular in form and is provided with the rabbeted edge $a$, and with the circular groove $b$ (preferably of V-shape in cross section).

B, indicates the outer shell which comprises the two semicircular sections $c$, which are designed to rest in the rabbet $a$ of the base and are provided at their contiguous edges with lugs $d$, for the reception of connecting bolts $e$; and C, indicates the core; the outline of which should be similar to that of the jar which it is desired to form. This core C, is formed in three pieces $f$, $g$, and $h$, and it is closed at one end and has its opposite end shaped to enter the groove $b$, of the base A, as shown in Fig. 1, so as to enable the said groove to hold the sections together. The middle piece or section $f$, of the core C, is gradually increased in width toward the open end of the core as shown in Fig. 4, and it also has the edges of its bottom portion $f'$, beveled inwardly so as to permit of it being easily removed from between the sections $g$, $h$, after the plaster of paris of which the mold is formed has set.

In the practical operation of our improved device, the parts are assembled as shown in Fig. 1; the sections $c$, of the shell B, being connected together and arranged in the rabbets $a$, of the plate A, and the core sections $f, g$, and $h$, being arranged in the circular groove $b$, of the base plate, which serves to hold them together and against casual displacement. The plaster of paris in a plastic state is now poured into the space between the shell B, and core C, until said core is entirely covered, and after the plaster of paris has set sufficiently the bolts $e$, are loosened and the sections $c$, of the shell B, spread slightly apart when they may be readily removed without injury to the outside of the mold. It is now necessary to remove the core from the mold, and to do this, the core and mold are lifted off the annular base A, and turned mouth up, after which the core section $f$, is loosened by any suitable device and raised upward and inward until it is entirely disengaged from the sections $g$, $h$, when it may be quickly removed without injury to the mold.

The removal of the core section $f$, as is obvious, renders the removal of the sections $g$, $h$, very easy and simple, and when they are removed, the plaster of paris mold such as shown in Fig. 5, is ready for use.

Having described our invention, what we claim is—

1. The herein described mold making device comprising the base plate A, having the circular groove $b$, in its upper side and also having the rabbeted edge $a$, the sectional shell B, adapted to rest in the rabbet of the base plate and the core C, formed of sections having one of their ends shaped to engage the groove $b$, of the base plate, substantially as specified.

2. A core for mold making devices, comprising the middle section $f$, and the outer sections $g$, $h$, the middle section being increased in width toward the open end of the core and having the edges of its bottom portion beveled inwardly, substantially as and for the purpose set forth.

JOSEPH W. PYLE.
GAYLORD W. MARTIN.

Witnesses:
S. C. WOODS,
G. G. CLARK.